(12) United States Patent
Kitamura

(10) Patent No.: US 7,738,783 B2
(45) Date of Patent: Jun. 15, 2010

(54) METHOD OF SETTING PHOTOGRAPHING CONDITIONS AND PHOTOGRAPHY APPARATUS USING THE METHOD

(75) Inventor: Yoshiro Kitamura, Ashigarakami-gun, Kanagawa-ken (JP)

(73) Assignee: Fujifilm Corporation (JP)

( * ) Notice: Subject to any disclaimer, the term of this patent is extended or adjusted under 35 U.S.C. 154(b) by 704 days.

(21) Appl. No.: 11/710,533

(22) Filed: Feb. 26, 2007

(65) Prior Publication Data
US 2007/0201857 A1 Aug. 30, 2007

(30) Foreign Application Priority Data
Feb. 27, 2006 (JP) .............................. 2006-049594

(51) Int. Cl.
*G03B 13/36* (2006.01)
*G03B 7/08* (2006.01)
(52) U.S. Cl. ....................... 396/123; 396/234
(58) Field of Classification Search ................. 396/123, 396/125, 234
See application file for complete search history.

(56) References Cited

U.S. PATENT DOCUMENTS

| 5,307,170 | A | * | 4/1994 | Itsumi et al. ............. 348/219.1 |
| 7,526,103 | B2 | * | 4/2009 | Schofield et al. ............. 382/104 |
| 2006/0222217 | A1 | * | 10/2006 | Kitamura et al. ............ 382/118 |
| 2007/0047822 | A1 | * | 3/2007 | Kitamura et al. ............ 382/224 |
| 2007/0223812 | A1 | * | 9/2007 | Ito .............................. 382/165 |
| 2007/0263997 | A1 | * | 11/2007 | Hirai et al. .................. 396/123 |

FOREIGN PATENT DOCUMENTS

JP 2005-128156 A 5/2005

* cited by examiner

*Primary Examiner*—W. B. Perkey
(74) *Attorney, Agent, or Firm*—Studebaker & Brackett PC; Donald R. Studebaker

(57) ABSTRACT

Automatic photographing condition setting is achieved with accuracy. For example, when a shutter button is half-pressed, preliminary photographing is carried out under different photographing conditions to acquire preview images. Then, each of the preview images is subjected to a face detection process. Photographing conditions for photographing a person are automatically adjusted to be suitable for a face area in one of the preview images from which a face has been detected.

6 Claims, 9 Drawing Sheets

METHOD OF SETTING PHOTOGRAPHING CONDITIONS AND PHOTOGRAPHY APPARATUS USING THE METHOD

BACKGROUND OF THE INVENTION

1. Field of the Invention

The present invention relates to a method of automatically setting photographing conditions of a photography apparatus for photographing a person, and a photography apparatus using the method.

2. Description of the Related Art

In photography apparatuses such as digital cameras, automatic adjustment of focus and diaphragm has conventionally been carried out. Further, in recent years, photography apparatuses have been proposed, which detect a human face in a preview image acquired before photographing, and automatically adjust the focus to the detected face (eyes) (see, for example, Japanese Unexamined Patent Publication No. 2005-128156). In the invention disclosed in Japanese Unexamined Patent Publication No. 2005-128156, human eyes are detected from image data acquired through photographing by an image taking unit, and information representing the position and the size of the detected eyes are obtained. Then, a focus frame is set based on the detected human eyes and the position and the size thereof. Thereafter, the focusing lens is controlled so that the face within the set focus frame is focused.

The above-described face detection uses luminance information and edge information of images. In this face detection process, if luminance information and/or edge information of a face area in an image do not represent characteristic structures of a face, the face cannot be detected. When a person is photographed using, for example, a digital camera, the face of the person can be detected from an acquired image if photographing conditions, such as focus and exposure, are suitable for photographing the person. However, if the photographing conditions are not suitable for photographing the person, the face within the image may not have characteristic structures that make the face discriminable as the face, and therefore, the face may not be detected automatically.

Therefore, in the invention disclosed in Japanese Unexamined Patent Publication No. 2005-128156, if an image used for the first face detection is acquired with the focal position and/or exposure condition not being optimal, the face in the image may not have edge information and/or luminance information that are characteristic to a face. This makes it difficult to detect the face in the image and to set the focal position using the detected face, and sometimes a face of a person may not be correctly focused when photographing the person.

SUMMARY OF THE INVENTION

In view of the above-described circumstances, the present invention is directed to provide an automatic photographing condition setting method that enables automatic setting of photographing conditions suitable for photographing a face of a person with accuracy, and a photography apparatus using the method.

In one aspect, the automatic photographing condition setting method of the present invention is a method of automatically setting a photographing condition of a photography means for photographing a person and acquiring an image. The method includes: acquiring a plurality of preview images through preliminary photographing for a plurality of times under different photographing conditions using the photographing means; applying a face detection process to each of the acquired preview images; and setting, as a photographing condition for photographing the person, the photographing condition used for acquiring the preview image from which a face has been detected through the face detection process.

In one aspect, the photography apparatus of the present invention includes: a photographing means for photographing a person and acquiring an image; a photographing controlling means for controlling the photographing means to carry out preliminary photographing for a plurality of times under different photographing conditions to acquire a plurality of preview images; a face detecting means for applying a face detection process to each of the preview images acquired through photographing by the photographing means; and a condition setting means for setting, as a photographing condition for photographing the person, the photographing condition used for acquiring the preview image from which a face has been detected through the face detection process by the face detecting means.

The photographing condition may include any condition, such as sensitivity of a CCD forming the photographing means, exposure and/or focal position.

It should be noted that, if more than one preview images containing a detectable face have been detected, the condition setting means can set the photographing condition used for acquiring one of the preview images as the photographing condition for photographing the person. For example, among the preview images containing a detectable face, the preview image having the highest luminance value may be selected.

The face detecting means may use any face detection method. For example, the face detecting means may include: a partial image generating means for generating a plurality of partial images by scanning the preview images with a sub-window formed by a frame having a size of a preset number of pixels; and a face discriminator for discriminating whether or not each of the partial images generated by the partial image generating means represents a face by using a plurality of discrimination results obtained by a plurality of weak learn classifiers that discriminate whether or not each of the partial images represents a face.

The plurality of weak learn classifiers may have any structure. For example, the weak learn classifiers may have a cascade structure, and each downstream weak learn classifier in the cascaded weak learn classifiers carries out discrimination only on the partial images discriminated for further discrimination by each upstream weak learn classifier in the cascaded weak learn classifiers.

The face detecting means may further include a candidate discriminator for discriminating whether or not each of the partial images generated by the partial image generating means represents a face and detecting a partial image having a possibility of representing a face as a candidate image, and the face discriminator may discriminate whether or not the partial image discriminated as the candidate image by the candidate discriminator represents a face.

DESCRIPTION OF THE PREFERRED EMBODIMENTS

Hereinafter, an embodiment of the present invention will be described in detail with reference to the drawings.

Figure 1:
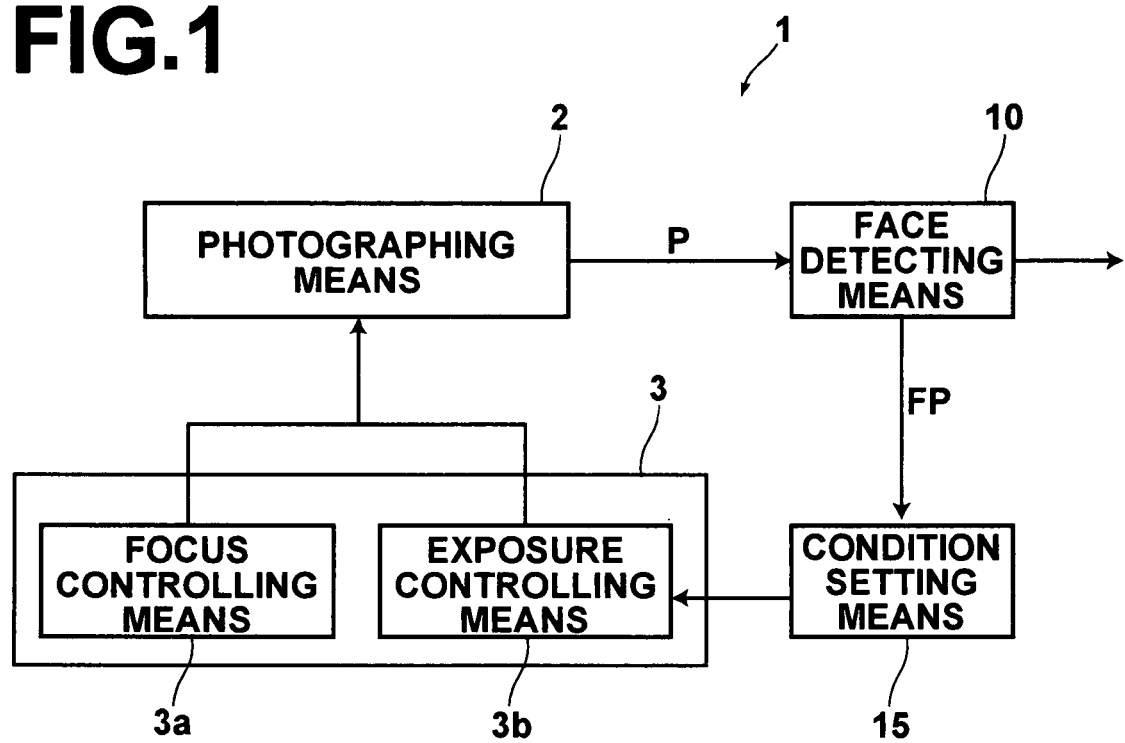
FIG. 1 is a block diagram illustrating an exemplary embodiment of a photography apparatus of the present invention.

FIG. 1 is a block diagram illustrating an exemplary embodiment of a photography apparatus of the present invention. The photography apparatus 1 is a device, such as a digital camera, for photographing a subject to acquire an image. The photography apparatus 1 includes: a photographing means 2 for photographing a person to acquire an image; a photographing controlling means 3 for controlling operation of the photographing means 2; a face detecting means 10 for carrying out a face detection process on each of preview images acquired through photographing by the photographing means 2; and a condition setting means 15 for setting, as photographing conditions for photographing the person, photographing conditions used for photographing the preview image from which the face has been detected through the face detection process.

The photographing means 2 includes, for example, an image pickup device such as a CCD, a focus adjusting mechanism formed by a group of lenses for focusing a subject image on the image pickup device, a diaphragm adjusting mechanism for adjusting exposure of the subject image with respect to the image pickup device, and a shutter. Operation of the photographing means 2 is controlled by the photographing controlling means 3.

The photographing controlling means 3 includes a focus controlling means 3a for controlling the focal position of the photographing means 2, and an exposure controlling means 3b for setting the exposure condition of the photographing means 2. The photographing controlling means 3 controls the photographing means to carry out preview photographing of a person for a plurality of times under different photographing conditions to acquire a plurality of preview images before the photographing means 2 photographs the person. Specifically, for example, when a shutter button is half-pressed, the focus controlling means 3a controls the focal position so that the person is photographed for a plurality of times under different focal position conditions. Similarly, the exposure controlling means 3b controls the exposure condition so that the person is photographed for a plurality of times under different exposure conditions. In this manner, the preview images with different focal positions and exposure conditions are acquired.

It should be noted that the focus controlling means 3a and the exposure controlling means 3b may exert control so that the exposure condition is changed for each different focal position to acquire the preview images, or the focal position is changed for each different exposure condition to acquire the preview images. Further, the photographing controlling means 3 may determine photographing conditions using a known technique such as a focus servo technique, and then adjust the photographing conditions to acquire the preview images.

Figure 2:
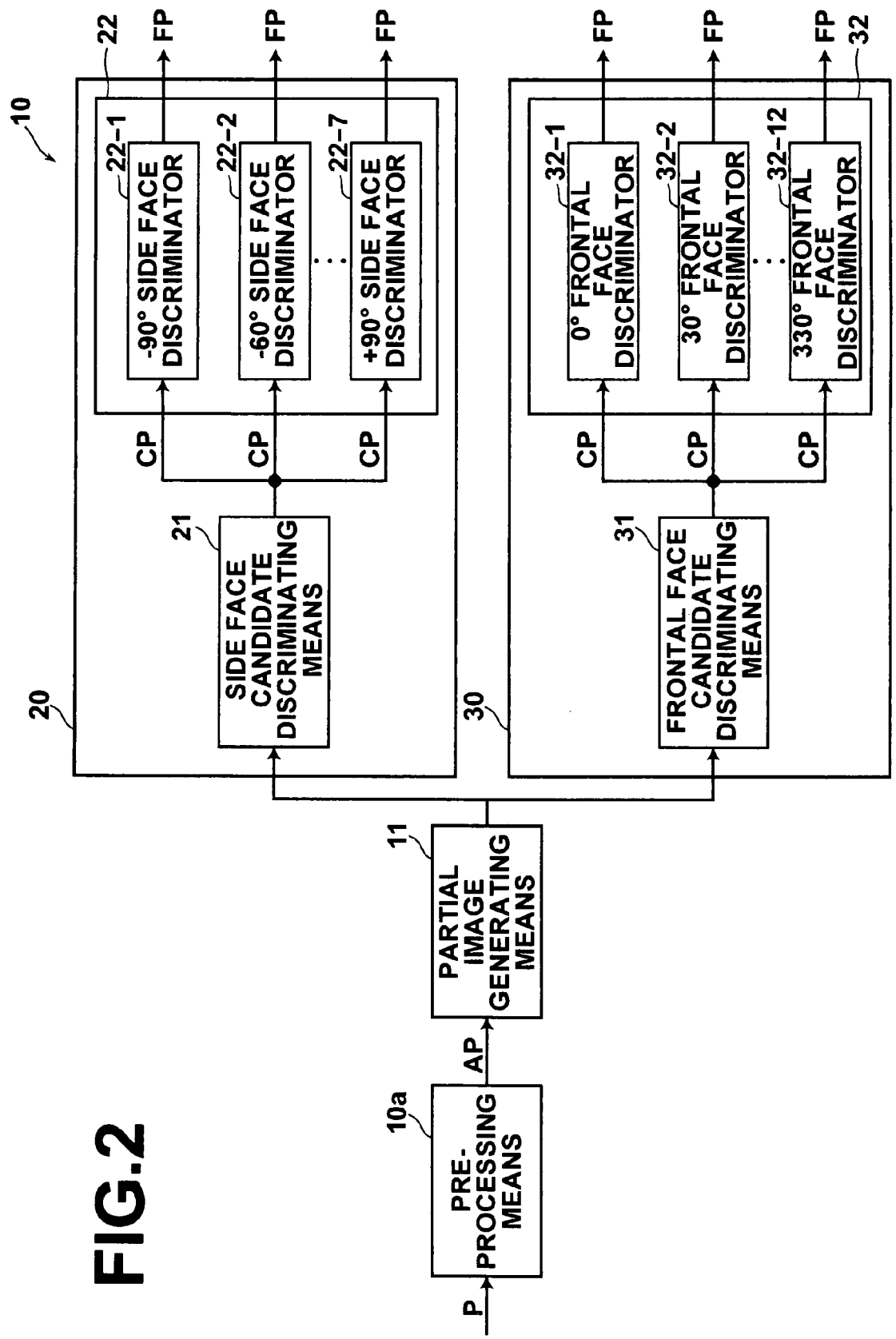
FIG. 2 is a block diagram illustrating one example of a face detecting means in the photography apparatus shown in FIG. 1.

The face detecting means 10 carries out the face detection process using an algorithm such as Adaboosting algorithm on the preview images acquired by the photographing means 2. FIG. 2 is a block diagram illustrating one example of the face detecting means 10. Now, the face detecting means 10 is described with reference to FIG. 2. The face detecting means 10 includes a partial image generating means 11 to generate partial images PP by scanning each preview image AP using a sub-window W, a side face detecting means 20 for detecting a partial image representing a side face from the partial images PP generated by the partial image generating means 11, and a frontal face detecting means 30 for detecting a partial image representing a frontal face from the partial images PP.

The preview image AP is subjected to pre-processing by the pre-processing means 10a before inputted to the partial image generating means 11. As shown at A to D in FIG. 3, the pre-processing means 10a converts the acquired preview image P having a certain resolution into multiple resolution images to generate a plurality of preview images P2, P3 and P4 having different resolutions. Further, the pre-processing means 10a carries out normalization (hereinafter referred to as "local normalization") on the preview images AP including the generated image (i.e., P and P2 to P4) to reduce variation in contrast levels between local areas of each preview image AP so that the contrast levels are converted into a predetermined level over the entire area of the preview image AP.

Figure 3:
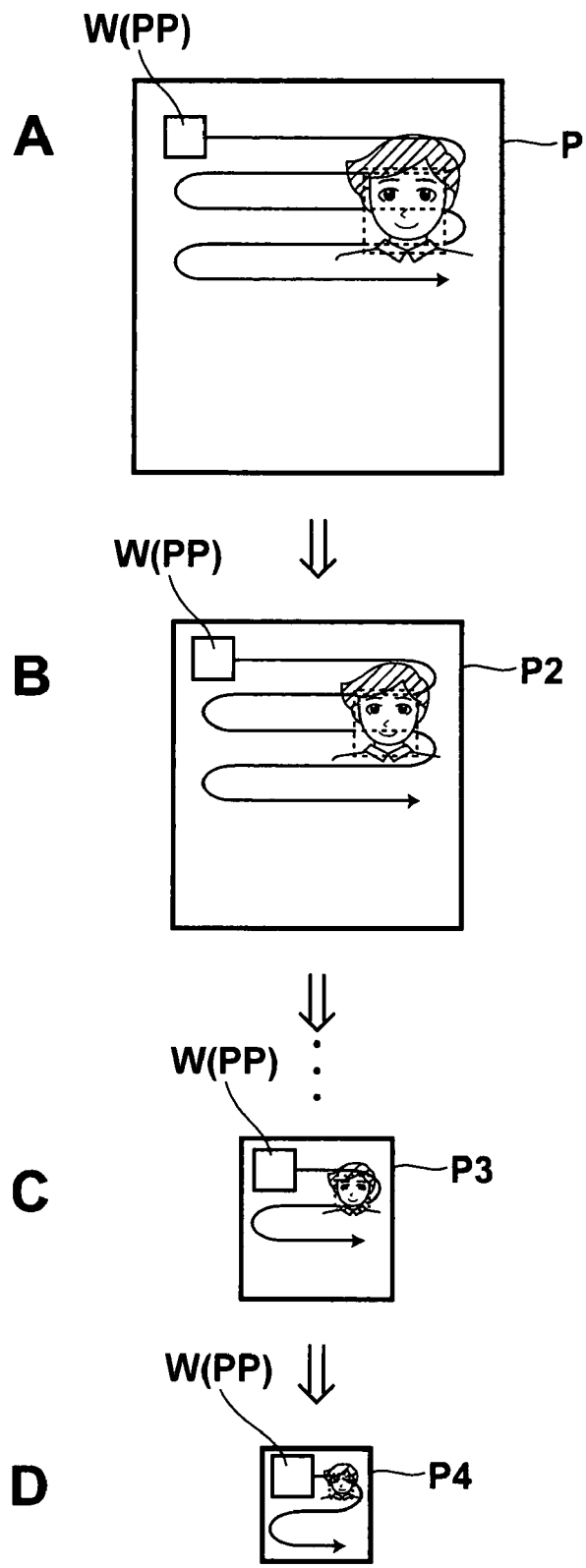
FIG. 3 is a schematic diagram illustrating how a sub-window is moved for scanning in a partial image generating means shown in FIG. 1.

As shown at A in FIG. 3, the partial image generating means 11 scans the preview images AP (i.e., P and P2 to P4) with the sub-window W having a size of a preset number of pixels (for example, 32×32 pixels) to cut out each area surrounded by the sub-window W to generate partial images PP having the size of the preset number of pixels. In particular, the partial image generating means 11 generates the partial images PP by changing the position of the sub-window W at an interval of a certain number of pixels.

As shown at B to D in FIG. 3, the partial image generating means 11 also generates partial images PP of the generated images having lower resolutions (P2 to P4) by scanning the images with the sub-window W. By generating the partial images PP of the lower resolution images P2 to P4, even if a frontal face or a side face of the subject does not fit within the sub-window W on the preview image P, the face may fit within the sub-window W on one of the lower resolution images P2 to P4, thereby ensuring detection accuracy.

The side face detecting means 20 detects a partial image(s) representing a side face from the plurality of partial images PP. The side face detecting means 20 includes a side face candidate discriminating means 21 for determining whether or not each partial image PP represents a side face and discriminating a partial image(s) PP having a possibility of representing a side face as a candidate image(s) CP, and a side face discriminating means 22 for determining whether or not each candidate image CP detected by the side face candidate discriminating means 21 represents a side face.

Figure 4:
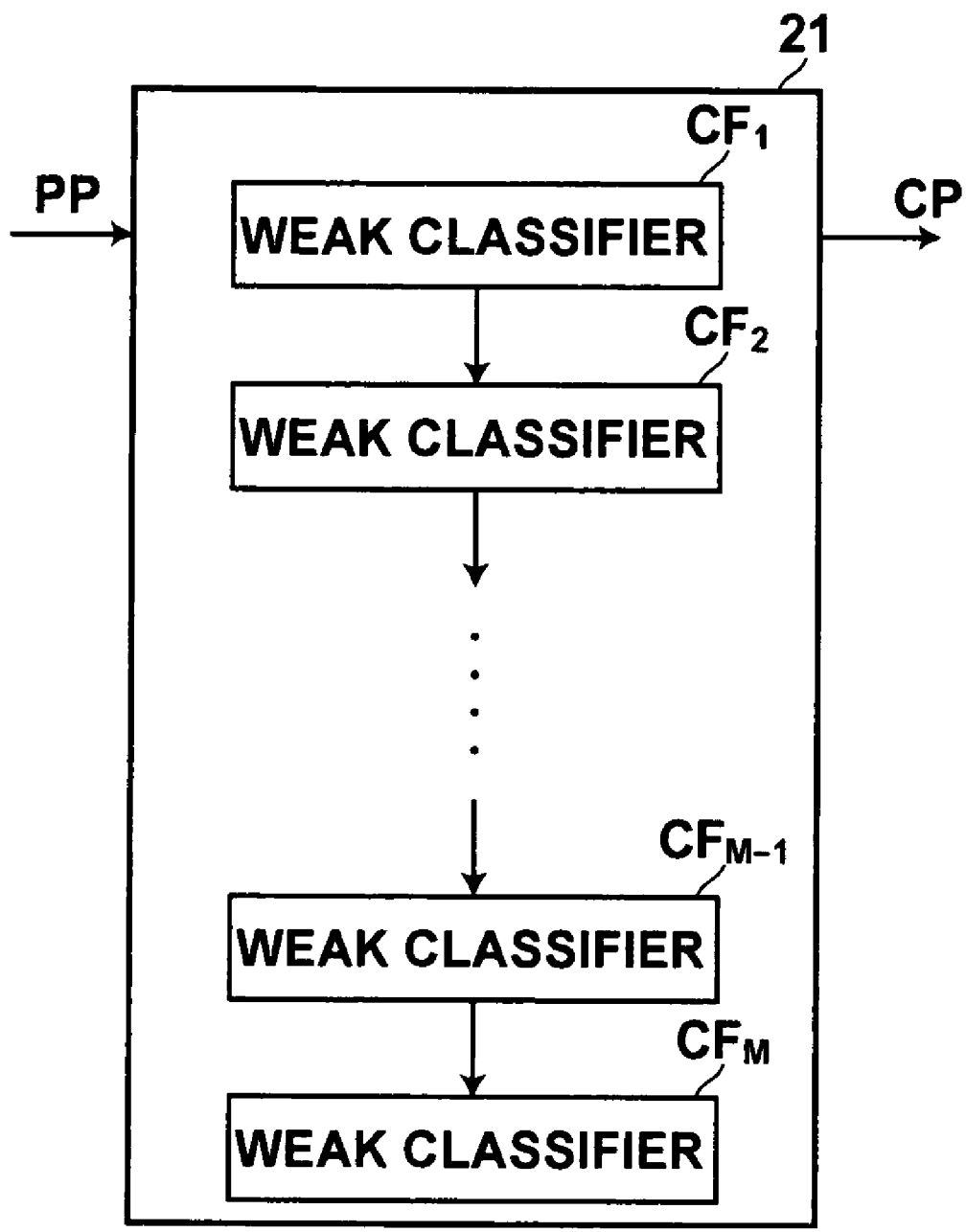
FIG. 4 is a block diagram illustrating one example of a side face candidate detecting means shown in FIG. 2.

The side face candidate discriminating means 21 carries out binary classification for discriminating whether or not each partial image PP represents a side face, and includes a side face candidate discriminator formed by a plurality of weak learn classifiers, as shown in FIG. 4. The side face candidate discriminating means 21 includes weak learn classifiers $CF_1$ to $CF_M$ (M is the number of weak learn classifiers), which have been generated through a learning process using an Adaboosting algorithm. Each of the weak learn classifiers $CF_1$ to $CF_M$ extracts a feature quantity x from each partial image PP, and discriminates whether or not the partial image PP represents a face using the feature quantity x. Then, the side face candidate discriminating means 21 finally discriminates whether or not the partial image PP represents a face using the results of discrimination by the weak learn classifiers $CF_1$ to $CF_M$.

Figure 5:
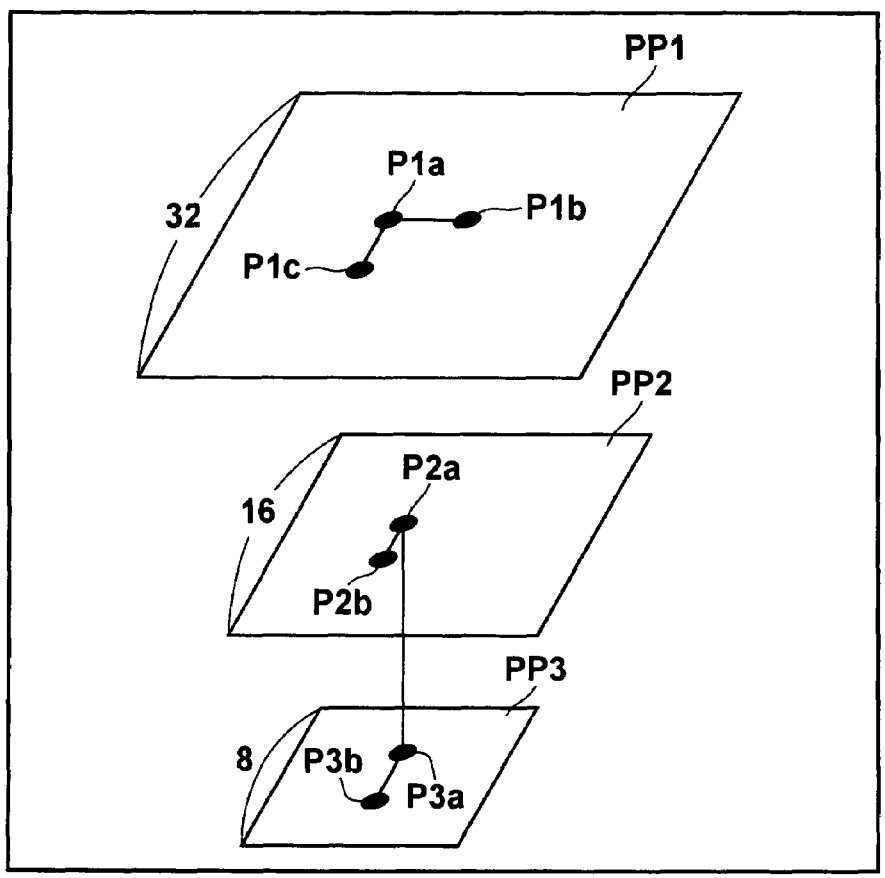
FIG. 5 is a schematic diagram illustrating how feature quantities are extracted from partial images.

Specifically, as shown in FIG. 5, the weak learn classifiers $CF_1$ to $CF_M$ extract, for example, luminance values at predetermined coordinates P1a, P1b and P1c in the partial image PP1. Further, the weak learn classifiers $CF_1$ to $CF_M$ extract, for example, luminance values at predetermined coordinate positions P2a and P2b in the lower resolution image PP2 corresponding to the partial image PP1, and luminance values at predetermined coordinate positions P3a and P3b in the lower resolution image PP3 corresponding to the partial image PP1. Thereafter, the seven coordinates P1a to P3b are grouped into pairs, and a difference in luminance between the paired coordinates is used as the feature quantity x. The weak learn classifiers $CF_1$ to $CF_M$ use different feature quantities from each other. For example, the weak learn classifier $CF_1$ uses a difference in luminance between the coordinates P1a and P1c as the feature quantity, and the weak learn classifier $CF_2$ uses a difference in luminance between the coordinates P2a and P2b as the feature quantity.

It should be noted that, although each of the weak learn classifiers $CF_1$ to $CF_M$ extracts the feature quantity x in this example, the feature quantities x may be extracted in advance from the plurality of partial images PP, and may be inputted to the weak learn classifiers $CF_1$ to $CF_M$. Further, although the luminance values are used in this example, other information such as contrast or edge may be used.

Figure 6:
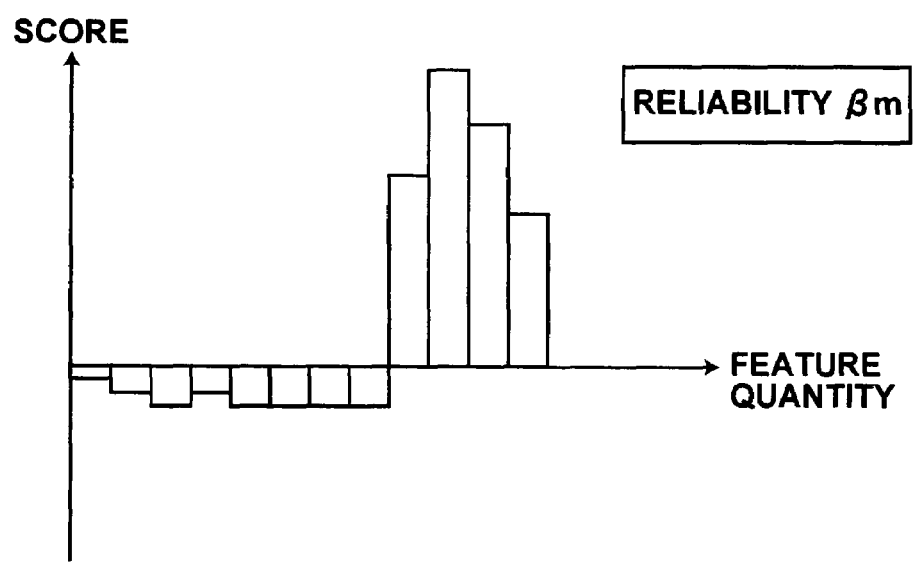
FIG. 6 is a graph illustrating one example of a histogram of a weak learn classifier shown in FIG. 4.

Each of the weak learn classifiers $CF_1$ to $CF_M$ has a histogram as shown in FIG. 6, and the weak learn classifiers $CF_1$ to $CF_M$ respectively output scores $f_1(x)$ to $f_M(x)$ corresponding to the values of the feature quantities x based on their respective histograms. Further, the weak learn classifiers $CF_1$ to $CF_M$ have their respective reliabilities $\beta_1$ to $\beta_M$, which indicate discrimination performances of the individual weak learn classifiers. Each of the weak learn classifiers $CF_1$ to $CF_M$ calculates a determination score $\beta_m \cdot f_m(x)$ using corresponding one of the scores $f_1(x)$ to $f_M(x)$ and corresponding one of the reliabilities $\beta_1$ to $\beta_M$. Then, determination is made as to whether or not the determination score $\beta_m \cdot f_m(x)$ calculated by each weak learn classifier $CF_m$ is not less than a predetermined threshold value Sref. If the determination score $\beta_m \cdot f_m(x)$ is not less than the predetermined threshold value ($\beta_m \cdot f_m(x) \geq Sref$), the partial image PP is discriminated as representing a face.

The weak learn classifiers $CF_1$ to $CF_M$ forming the side face candidate discriminating means 21 have a cascade structure, in which only the partial image(s) PP discriminated as representing a face by all the weak learn classifiers $CF_1$ to $CF_M$ is outputted as a candidate image(s) CP. In other words, only the partial image PP that has been discriminated by each weak learn classifier $CF_m$ as representing a face is sent to the downstream weak learn classifier $CF_{m+1}$ for further discrimination, and the partial image PP that have been discriminated by the weak learn classifier $CF_m$ as not representing a face is not subjected to discrimination by the downstream weak learn classifier $CF_{m+1}$. In this manner, the number of the partial images PP to be discriminated by the downstream weak learn classifiers can be reduced, thereby speeding up the discrimination operation.

It should be noted that the determination scores $S_1$ to $S_M$ outputted from the weak learn classifiers $CF_1$ to $CF_M$ may not separately be determined as to whether or not they are not less than the predetermined threshold value Sref. The discrimination may be made by determining at each weak learn classifier $CF_m$ whether or not a sum $\Sigma_{r=1}^{m} \beta_r \cdot f_r$ of the determination scores calculated by the upstream weak learn classifiers $CF_1$ to $CF_{m-1}$ is not less than a predetermined threshold value S1ref ($\Sigma_{r=1}^{m} \beta_r \cdot f_r(x) \geq S1ref$). This allows determination with taking the determination scores calculated by the upstream weak learn classifiers into account, thereby enhancing determination accuracy.

The side face discriminating means 22 shown in FIG. 2 includes seven side face discriminators 22-1 to 22-7 for discriminating faces in images having different rotational angles ranging from –90° to +90° at an interval of 30°, respectively, such that the –90° side face discriminator 22-1 discriminates a face having an orientation (angle) of –90°, i.e., side face, the –60° side face discriminator 22-2 discriminates a face having an orientation (angle) of –60°, and the like. Further, for example, the –90° side face discriminator 22-1 can discriminate a face having a rotational angle within a range of ±15° from –90°. It should be noted that, similarly to the side face candidate discriminating means 21 described above, each of the side face discriminators 22-1 to 22-7 includes a plurality of weak learn classifiers that have been generated through a learning process using an Adaboosting algorithm (see FIG. 4), and carries out discrimination in a manner similar to that of the side face candidate discriminating means 21.

Next, the frontal face detecting means 30 is described. The frontal face detecting means 30 detects a partial image(s) PP representing a frontal face from the plurality of partial images PP. The frontal face detecting means 30 includes a frontal face candidate discriminating means 31 for determining whether or not each partial image PP represents a frontal face and discriminating a partial image (s) PP having a possibility of representing a frontal face as a candidate image(s) CP, and a frontal face discriminating means 32 for determining whether or not each candidate image CP detected by the frontal face candidate discriminating means 31 represents a frontal face.

The frontal face candidate discriminating means 31 carries out binary classification for discriminating whether or not each partial image PP represents a frontal face or non-face, and includes a candidate discriminator formed by a plurality of weak learn classifiers, which have been generated through a learning process using an Adaboosting algorithm, similarly to the above-described side face candidate discriminating means 21 (see FIG. 4).

The frontal face discriminating means 32 includes twelve frontal face discriminators 32-1 to 32-12 for discriminating faces in images having different rotational angles ranging from 30° to 330° at an interval of 30°, respectively, such that the 0° frontal face discriminator 32-1 discriminates a face having an angle of 0° between the center line of the face and the longitudinal direction of the image, the 30° frontal face discriminator 32-2 discriminates a face having the angle of 30°, and the like. Further, for example, the 0° frontal face discriminator 32-1 can discriminate a face having a rotational angle within a range of ±15° from 0° (i.e., 345° to 15°).

It should be noted that, similarly to the side face candidate discriminating means 21 described above, each of the frontal face discriminators 32-1 to 32-12 includes a plurality of weak learn classifiers that have been generated through a learning process using a boosting algorithm (see FIG. 4), and carries out discrimination in a manner similar to that of the side face candidate discriminating means 21.

Figure 7:
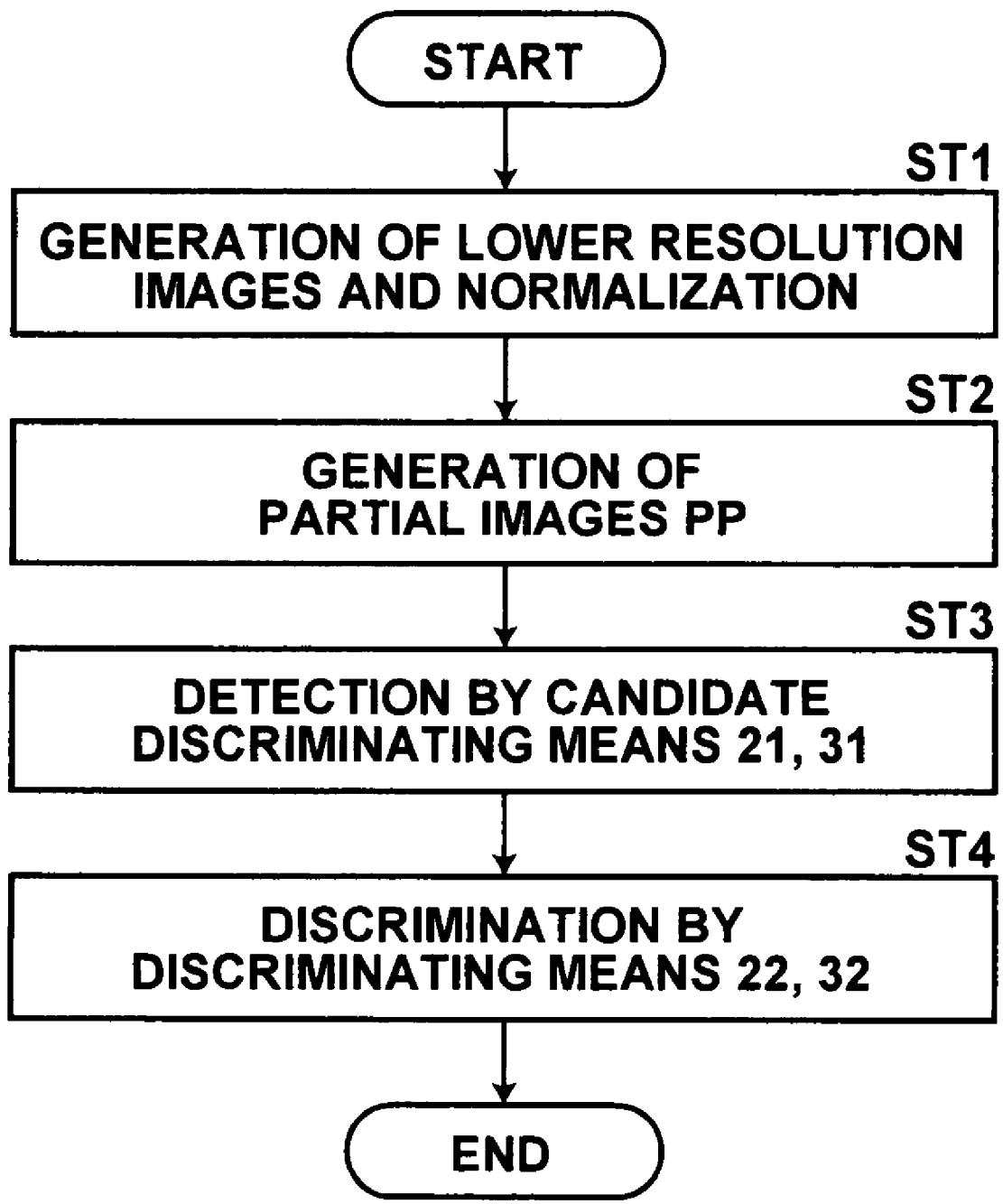
FIG. 7 is a flow chart illustrating an exemplary operation of the face detecting means shown in FIG. 2.

FIG. 7 is a flow chart illustrating an example of operation of the face detecting means 10. Now, the example of operation of the face detecting means 10 will be described with reference to FIGS. 1 to 7. First, the pre-processing means 10a generates lower resolution images of a preview image P and normalize these preview images AP (step ST1). Thereafter, the partial image generating means 11 scans each preview image AP with the sub-window W at a certain scanning interval to generate partial images PP (step ST2). The generated partial images PP are respectively discriminated by the side face candidate discriminating means 21 and the frontal face candidate discriminating means 31 as to whether or not they represent a face, and a candidate image(s) CP having a possibility of representing a face is detected. The candidate image(s) CP detected by the side face candidate discriminating means 21 is further discriminated by the side face discriminators 22-1 to 22-7, and a face image(s) FP representing a side face is detected. The candidate image(s) CP detected by the frontal face candidate discriminating means 31 is further discriminated by the frontal face discriminators 32-1 to 32-12, and a face image(s) FP representing a frontal face is detected (steps ST3 to ST4).

Now, the condition setting means 15 shown in FIG. 1 will be described (in this and the following descriptions, the "preview image AP" may refer to a preview image acquired through preliminary photographing or a set of multi-resolution images of the preview image generated for the face detection, as appropriate, for simplicity of the explanation). The condition setting means 15 selects one preview image AP from which a face has been detected through the face detection process by the face detecting means 10, and automatically adjusts photographing conditions, such as the focal position and the exposure condition, based on the face detected in the preview image AP.

First, condition setting of the focal position is explained with reference to FIG. 8. As shown at A in FIG. 8, under control of the photographing controlling means 3, a plurality of (n) preview images AP are acquired under different photographing conditions. Subsequently, if the face detecting means 10 detects two preview images CAP containing a detectable face from the preview images AP as shown at B in FIG. 8, then, as shown at C in FIG. 8, the condition setting means 15 selects one of the two preview images CAP, and sets in the focus controlling means 3a the focal position used for photographing the selected preview image CAP as a photographing condition to be set for the photographing means 2.

Next, setting of the exposure condition is explained with reference to FIG. 9. As shown at A in FIG. 9, under control of the photographing controlling means 3, a plurality of (n) preview images AP are acquired under different photographing conditions. Subsequently, if the face detecting means 10 detects two preview images CAP containing a detectable face from the preview images AP, then, as shown at B in FIG. 9, the condition setting means 15 selects one of the two preview images CAP, and sets in the exposure controlling means 3b the exposure condition used for photographing the selected preview image CAP as a photographing condition to be set for the photographing means 2.

It should be noted that, if more than one preview images CAP containing a detectable face have been detected, as described above, the condition setting means 15 sets the photographing conditions used for photographing one of the preview images CAP. For example, among the preview images CAP containing a detectable face, the preview image CAP having the highest luminance value may be selected. Further, setting of the focal position and the exposure condition described above may be carried out separately or at the same time.

Figure 9:
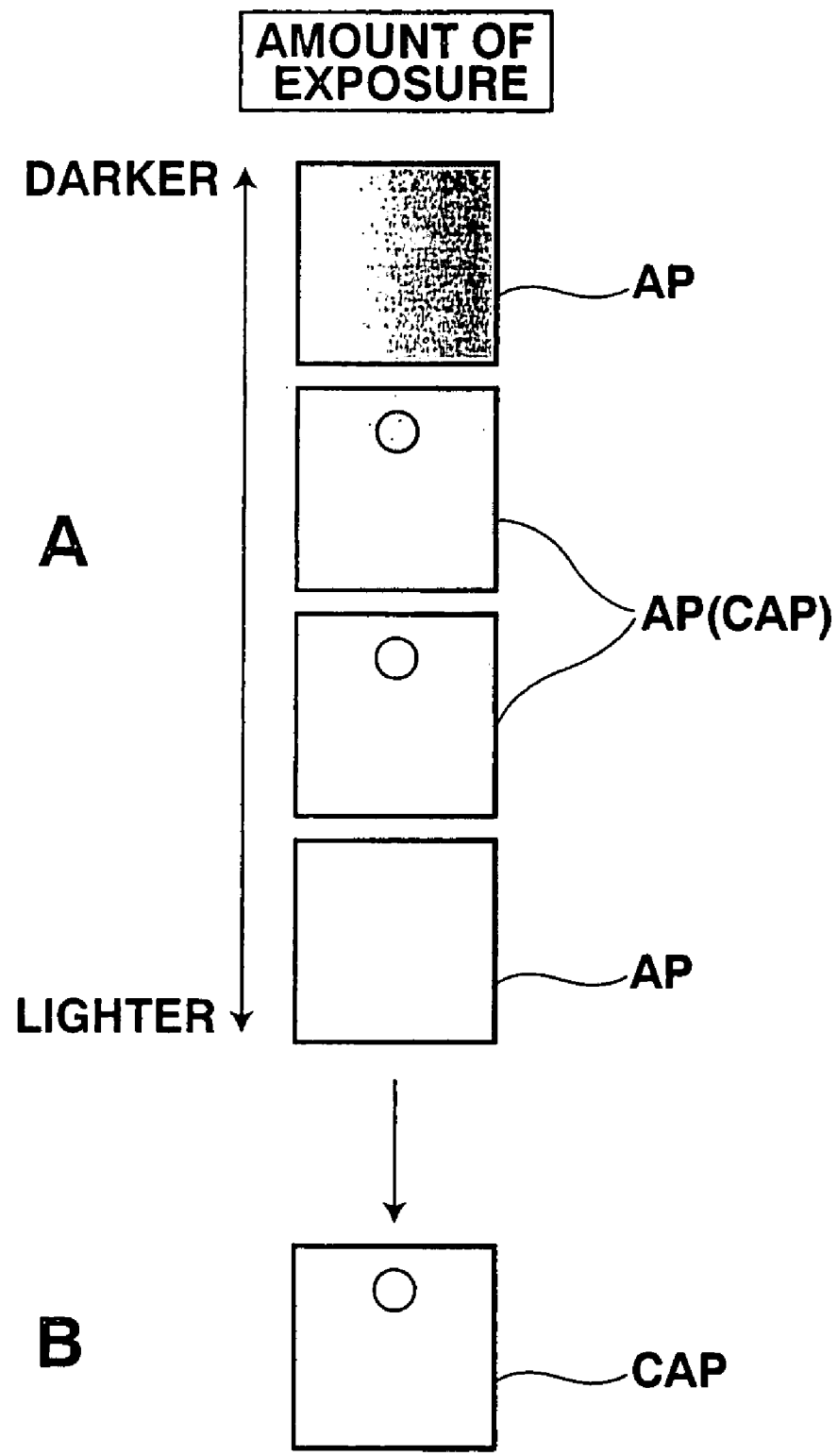
FIG. 9 is a schematic diagram illustrating how an exposure condition is set in the condition setting means.
Figure 10:
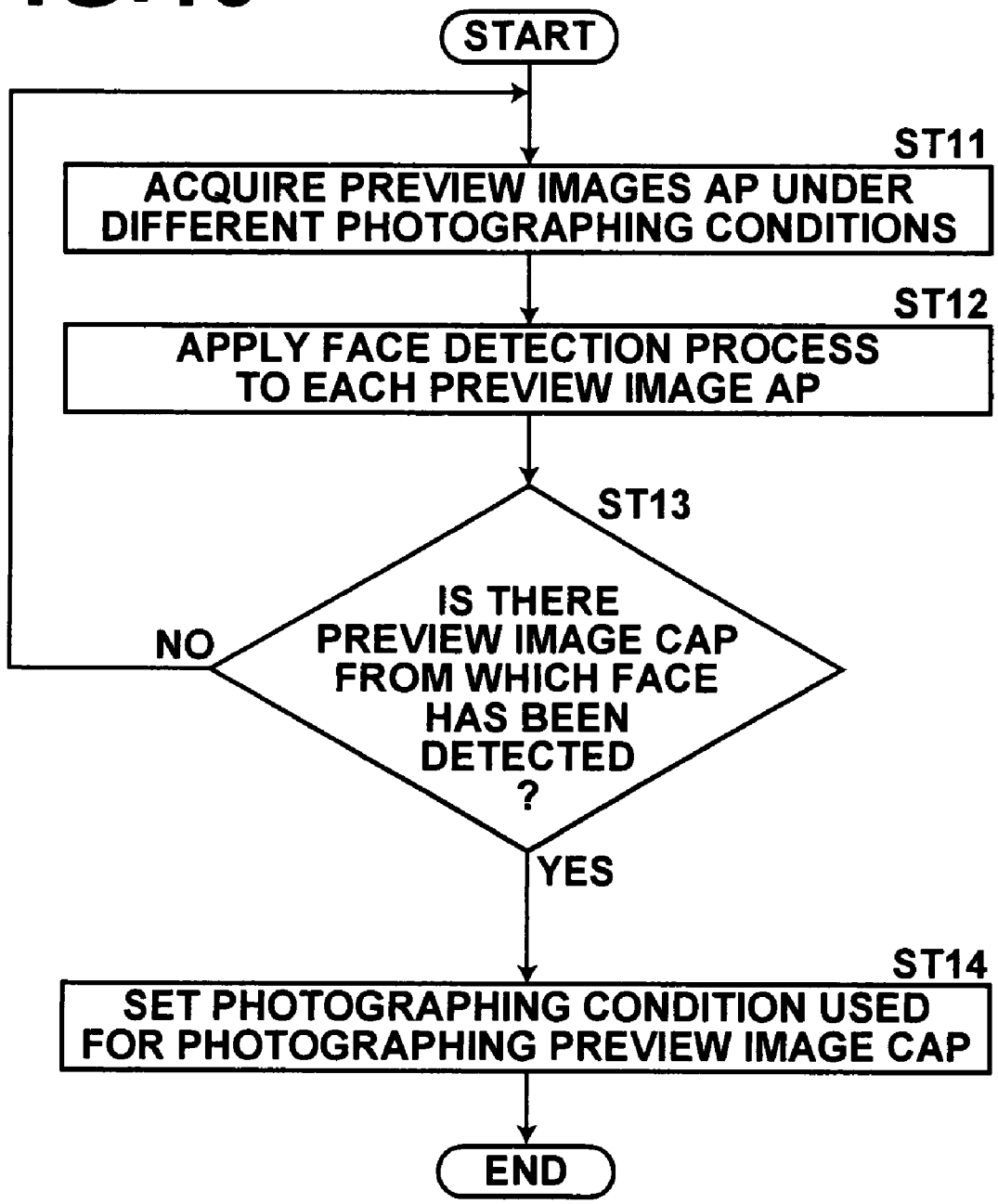
FIG. 10 is a flow chart illustrating an exemplary embodiment of an automatic photographing condition setting method of the invention.

FIG. 10 is a flow chart illustrating an exemplary embodiment of a photographing condition setting method of the present invention. Now, the photographing condition setting method will be described with reference to FIGS. 1 to 10. The photographing means 2 is controlled by the photographing controlling means 3 such that preliminary photographing is carried out under different photographing conditions when, for example, the shutter button is half-pressed. Then, the plurality of preview images are acquired (step ST11, see FIGS. 8 and 9). Subsequently, each of the acquired preview images are subjected to the face detection process at the face detecting means 10 (step ST12, see FIGS. 2 to 7). If no face is detected from the preview images (step ST13), the photographing conditions are changed and new preview images AP are acquired.

Then, at the condition setting means 15, photographing conditions for photographing the person are automatically adjusted to be suitable for a face area in the detected preview image CAP containing a detectable face (step ST14). In this manner, for automatically adjusting the focal position to a face of a person, the face is detected using the plurality of preview images AP. This can reliably prevent the failure of automatic focus adjustment due to unsuccessful face detection.

That is, conventional automatic focus detection methods includes a contrast AF (automatic focus) method utilizing high-frequency components of an image and a peak AF method utilizing high-frequency components of luminance signals of an image. When these methods are used singly to adjust the focal position for acquiring an image, a face contained in the acquired image may not be focused, i.e., the face in the image may not necessarily be detected. In other words, a focal position that renders an entire image with the maximum contrast or the maximum luminance information may not necessarily focus the face. Therefore, sometimes the face in the image cannot be detected. In contrast, in the above-described photographing condition setting method, the face detection process is carried out for each of the preview images taken under different photographing conditions, and this markedly improves the face detection rate.

Further, when a particular person is photographed, a photographer typically adjusts the photographing conditions such as the focus to the person, and the photographing conditions are typically set so that the human face in the photograph is discriminable. Therefore, photographing conditions which render an image exhibiting characteristic structures of a face to the extent that the face can be detected by the face detection process can be considered as being optimal photographing conditions. As a result, the photographing conditions can be automatically set with accuracy.

According to the above-described embodiment, the preview images AP taken under different photographing conditions are subjected to the face detection process, and the photographing conditions are set to be suitable for a face detected from one of the preview images AP. This can prevent the failure of automatic focus adjustment due to unsuccessful face detection.

Further, since the weak learn classifiers have a cascade structure, and each downstream weak learn classifier in the cascaded weak learn classifiers carries out discrimination only on the partial images which have been discriminated for further discrimination by each upstream weak learn classifier in the cascaded weak learn classifiers, the number of partial images to be discriminated by the downstream weak learn classifiers can significantly be reduced, thereby speeding up the discrimination operation.

Furthermore, since the face detecting means 10 includes the candidate detecting means for detecting the partial images having a possibility of representing a face as the candidate images, the number of partial images to be subjected to detection by the face detecting means can be reduced, thereby speeding up the discrimination operation.

The present invention is not limited to the above described embodiment. For example, although the photographing conditions are automatically set to be suitable for the detected face in the above-described embodiment, the photographing conditions set by the condition setting means 15 may further be fine-adjusted using a photographing condition setting technique according to the above-described known contrast AF method, peak AF method, or the like, to accomplish more optimal photographing condition setting.

Figure 8:
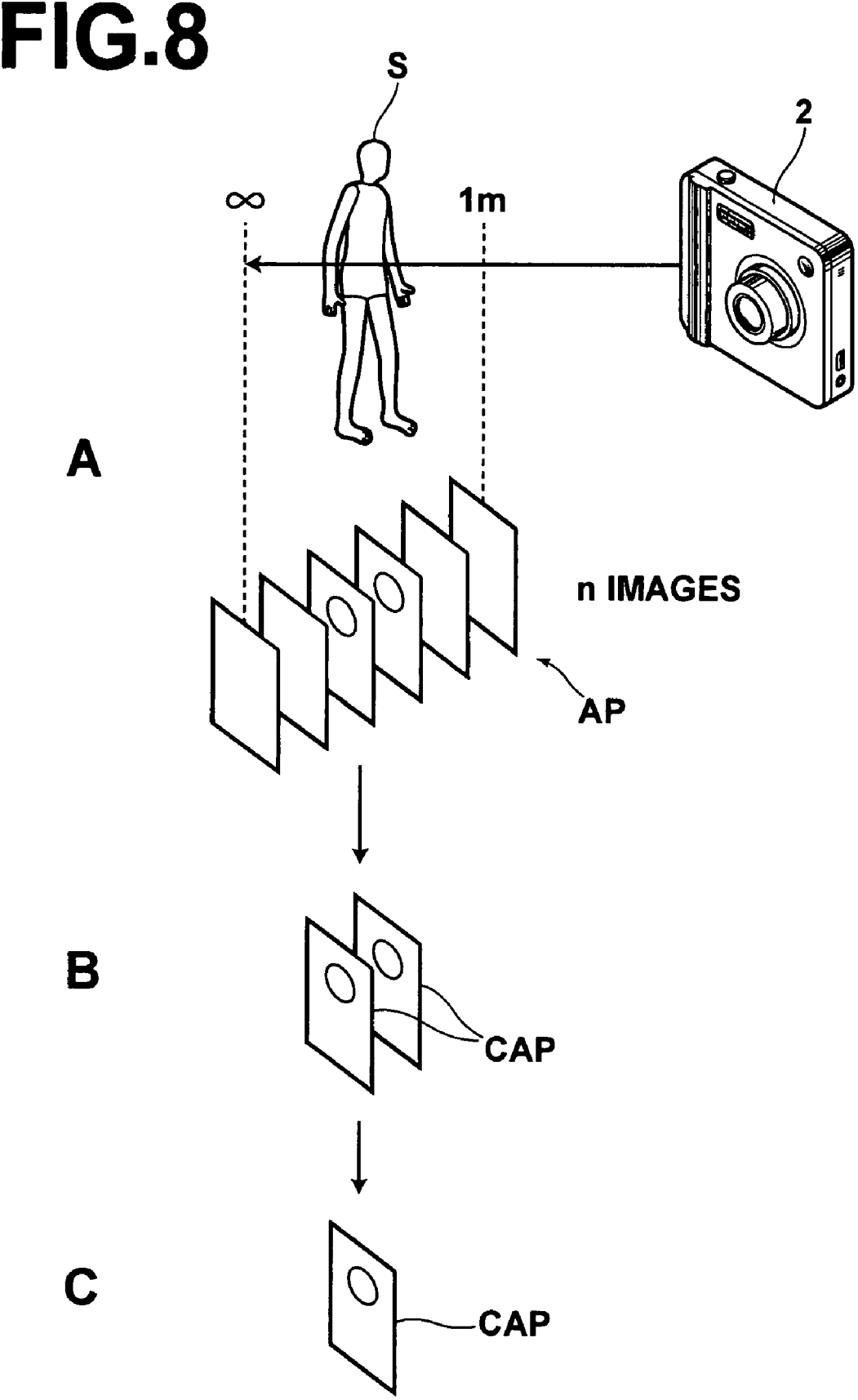
FIG. 8 is a schematic diagram illustrating how a focal position condition is set in a condition setting means.

Although the condition setting means 15 automatically sets both of the focal position and the exposure condition, as shown in FIGS. 8 and 9, the condition setting means 15 may set only one of the focal position and the exposure condition, or may set other photographing conditions.

According to the automatic photographing condition setting method and the photography apparatus using the method of the present invention, the detection rate of faces in images is improved by acquiring a plurality of preview images through preliminary photographing for a plurality of times under different photographing conditions using the photographing means, applying the face detection process to each of the acquired preview images, and setting, as a photographing condition for photographing the person, the photographing condition used for acquiring the preview image from which a face has been detected through the face detection process. Thus, the occurrence rate of the failure of automatic focus adjustment due to unsuccessful face detection can be reduced.

Further, when a particular person is photographed, a photographer typically adjusts the photographing conditions such as the focus to the person, and the photographing conditions are typically set so that the human face in the photograph is discriminable. Therefore, photographing conditions which render an image exhibiting characteristic structures of a face to the extent that the face can be detected by the face detection process can be considered as being optimal photographing conditions. As a result, the photographing conditions can be automatically set with accuracy.

Furthermore, since the weak learn classifiers have a cascade structure, and each downstream weak learn classifier in the cascaded weak learn classifiers carries out discrimination only on the partial images which have been discriminated for further discrimination by each upstream weak learn classifier in the cascaded weak learn classifiers, the number of partial images to be discriminated by the downstream weak learn classifiers can significantly be reduced, thereby speeding up the discrimination operation.

Moreover, since the face detecting means further includes a candidate discriminating means for discriminating whether or not each of the partial images generated by the partial image generating means represents a face and detecting the partial image(s) having a possibility of representing a face as the candidate image(s), and the face discriminator discriminates whether or not the partial image(s) discriminated as the candidate image(s) by the candidate discriminator represents a face, the number of partial images to be subjected to detection by the face detecting means can be reduced, thereby speeding up the discrimination operation.

What is claimed is:

1. A method of automatically setting a photographing condition of a photographing means for photographing a person and acquiring an image, the method comprising:
   acquiring a plurality of preview images through preliminary photographing for a plurality of times under different photographing conditions using the photographing means;
   applying a face detection process to each of the acquired preview images; and
   setting, as a photographing condition for photographing the person, the photographing condition used for acquiring the preview image from which a face has been detected through the face detection process.

2. A photography apparatus comprising:
   a photographing means for photographing a person and acquiring an image;
   a photographing controlling means for controlling the photographing means to carry out preliminary photographing for a plurality of times under different photographing conditions to acquire a plurality of preview images;
   a face detecting means for applying a face detection process to each of the preview images acquired through photographing by the photographing means; and
   a condition setting means for setting, as a photographing condition for photographing the person, the photographing condition used for acquiring the preview image from which a face has been detected through the face detection process by the face detecting means.

3. The photography apparatus as claimed in claim 2, wherein the photographing condition comprises exposure condition or focusing condition.

4. The photography apparatus as claimed in claim 2, wherein the face detecting means comprises:
   a partial image generating means for generating a plurality of partial images by scanning the preview images with a sub-window formed by a frame having a size of a preset number of pixels; and
   a face discriminator for discriminating whether or not each of the partial images generated by the partial image generating means represents a face, and
   wherein the face discriminator comprises a face discriminator for discriminating whether or not each of the partial images represents a face using a plurality of discrimination results obtained by a plurality of weak learn classifiers.

5. The photography apparatus as claimed in claim 4, wherein the plurality of weak learn classifiers have a cascade structure, and each downstream weak learn classifier in the cascaded weak learn classifiers carries out discrimination only on the partial images discriminated for further discrimination by each upstream weak learn classifier in the cascaded weak learn classifiers.

6. The photography apparatus as claimed in claim 4, wherein the face detecting means further comprising a candidate discriminator for discriminating whether or not each of the partial images generated by the partial image generating means represents a face and detecting a partial image having a possibility of representing a face as a candidate image, and the face discriminator discriminates whether or not the partial image discriminated as the candidate image by the candidate discriminator represents a face.

* * * * *